(12) United States Patent
Kamada

(10) Patent No.: US 10,981,376 B2
(45) Date of Patent: Apr. 20, 2021

(54) INSPECTION APPARATUS, IMAGE READING APPARATUS, IMAGE FORMING APPARATUS, INSPECTION METHOD, AND RECORDING MEDIUM

(71) Applicant: Takuji Kamada, Kanagawa (JP)

(72) Inventor: Takuji Kamada, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 118 days.

(21) Appl. No.: 16/454,716

(22) Filed: Jun. 27, 2019

(65) Prior Publication Data

US 2020/0009860 A1    Jan. 9, 2020

(30) Foreign Application Priority Data

Jul. 3, 2018  (JP) .............................. JP2018-127179
Jul. 31, 2018 (JP) .............................. JP2018-144301

(51) Int. Cl.
*B41F 33/00*     (2006.01)
*H04N 1/00*      (2006.01)
(Continued)

(52) U.S. Cl.
CPC .......... *B41F 33/0036* (2013.01); *G06T 7/001* (2013.01); *G06T 7/11* (2017.01);
(Continued)

(58) Field of Classification Search
CPC ........ B41F 33/0036; G06T 7/136; G06T 7/11; G06T 7/001; G06T 2207/30144; H04N 1/00034
See application file for complete search history.

(56) References Cited

U.S. PATENT DOCUMENTS

2002/0150306 A1* 10/2002 Baron ................... H04N 5/2354
                                                         382/275
2007/0165960 A1*  7/2007 Yamada ................ H04N 9/735
                                                         382/254
(Continued)

FOREIGN PATENT DOCUMENTS

JP    2003-283773    10/2003
JP    2010-192634     9/2010
(Continued)

*Primary Examiner* — Mark Roz
(74) *Attorney, Agent, or Firm* — Harness, Dickey & Pierce, P.L.C.

(57) ABSTRACT

An inspection apparatus that inspects printed matter generated based on print data by using a read image of a printed surface of the printed matter includes processing circuitry. The processing circuitry performs acquisition, calculation, correction, and comparison. The processing circuitry acquires the read image as an inspection target image, and acquires a reference image based on the print data. The processing circuitry calculates a flare inverse correction value based on flare that occurs at time of creation of the inspection target image. The processing circuitry performs flare inverse correction on the reference image based on the flare inverse correction value to acquire a corrected reference image. The processing circuitry compares the corrected reference image with the inspection target image to perform inspection.

8 Claims, 12 Drawing Sheets

(51) Int. Cl.
*G06T 7/11* (2017.01)
*G06T 7/136* (2017.01)
*G06T 7/00* (2017.01)

(52) U.S. Cl.
CPC ......... *G06T 7/136* (2017.01); *H04N 1/00034* (2013.01); *G06T 2207/30144* (2013.01)

(56) References Cited

U.S. PATENT DOCUMENTS

| | | | |
|---|---|---|---|
| 2008/0158376 A1* | 7/2008 | Miki | H04N 5/2351 348/222.1 |
| 2011/0273732 A1 | 11/2011 | Kojima et al. | |
| 2012/0121139 A1 | 5/2012 | Kojima et al. | |

FOREIGN PATENT DOCUMENTS

| JP | 2011-237562 | 11/2011 |
|---|---|---|
| JP | 2012-103225 | 5/2012 |

\* cited by examiner

FIG. 3
RELATED ART
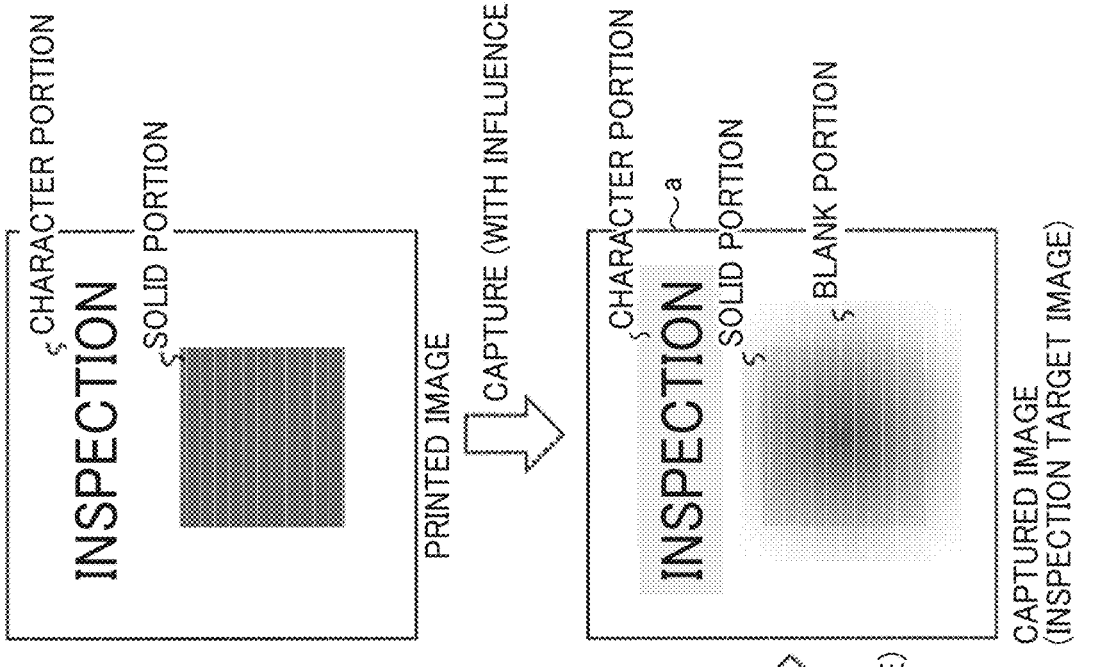
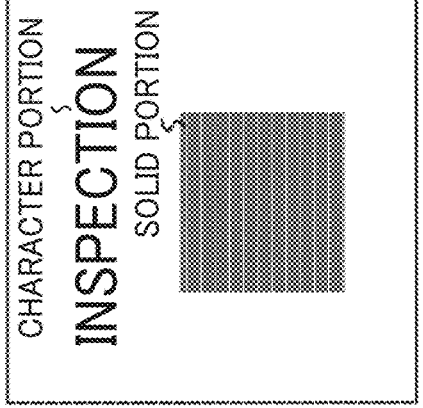
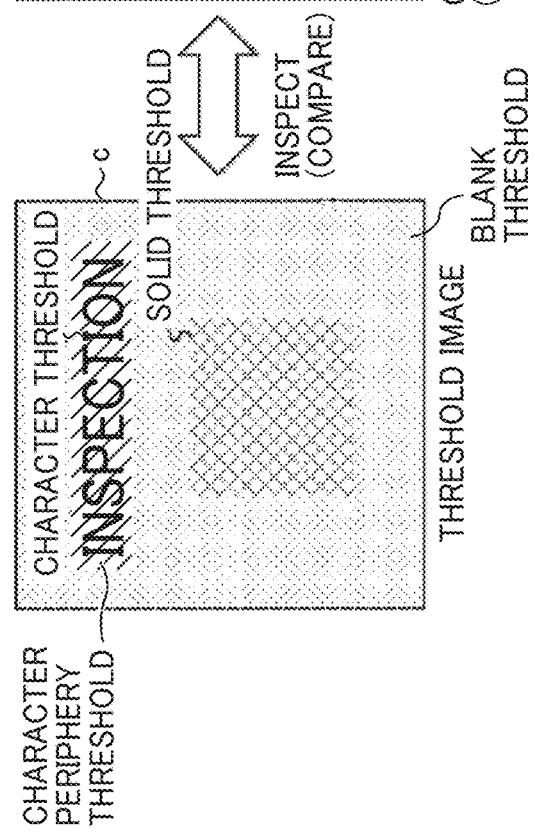

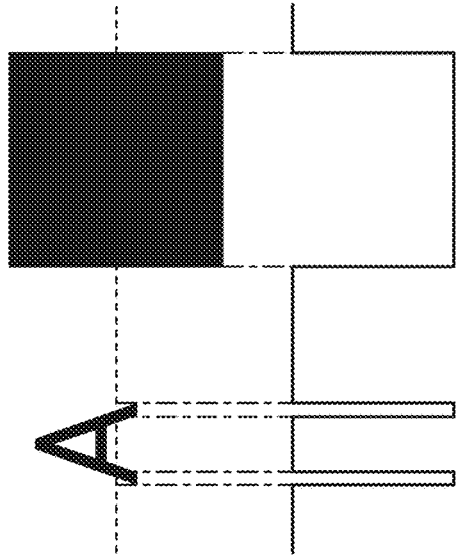
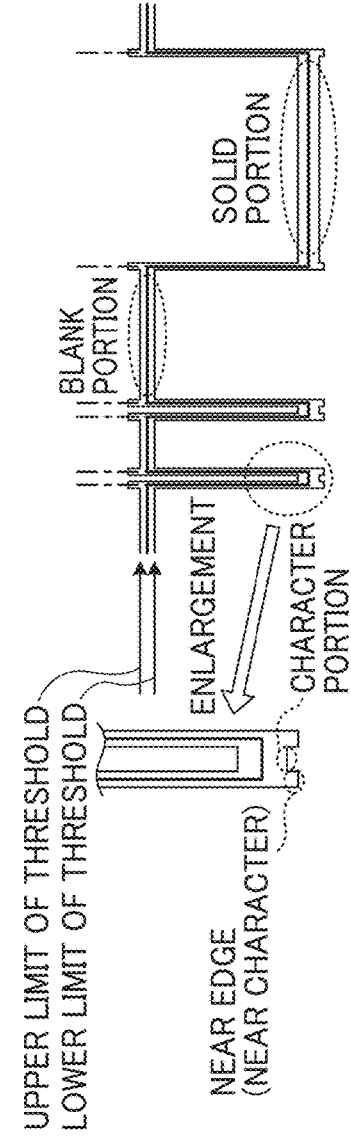
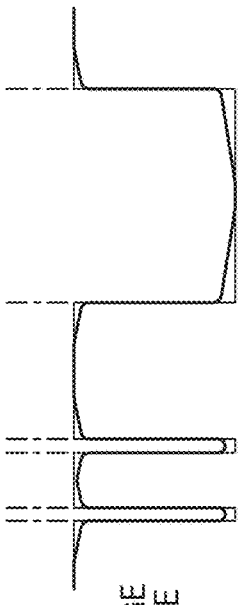
FIG. 12A REFERENCE IMAGE (IDEAL STATE)
FIG. 12B THRESHOLD IMAGE (IDEAL STATE)
FIG. 12C FLARE INVERSELY CORRECTED IMAGE

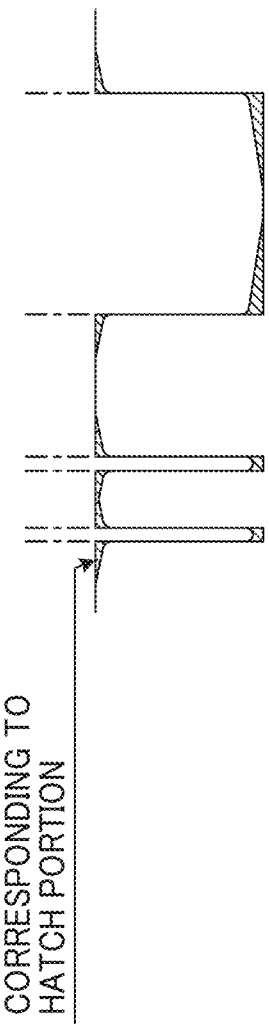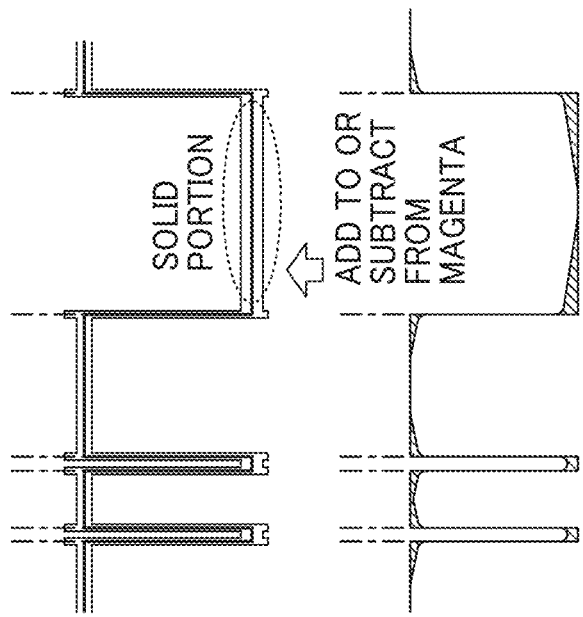
FIG. 12D CALCULATE DIFFERENCE BETWEEN REFERENCE IMAGE (FIG. 12A) AND FLARE INVERSELY CORRECTED IMAGE (FIG. 12C)
FIG. 12E ADD DIFFERENCE (FIG. 12D) TO THRESHOLD IMAGE (FIG. 12B) IN SOLID PORTION

INSPECTION APPARATUS, IMAGE READING APPARATUS, IMAGE FORMING APPARATUS, INSPECTION METHOD, AND RECORDING MEDIUM

CROSS-REFERENCE TO RELATED APPLICATIONS

This patent application is based on and claims priority pursuant to 35 U.S.C. § 119 to Japanese Patent Application Nos. 2018-127179, filed on Jul. 3, 2018, and 2018-144301, filed on Jul. 31, 2018 in the Japan Patent Office, the entire disclosures of which are hereby incorporated by reference herein.

BACKGROUND

Technical Field

Exemplary aspects of the present disclosure relate to an inspection apparatus, an image reading apparatus, an image forming apparatus, an inspection method, and a recording medium.

Related Art

In production printing, inspection of printouts from printers is demanded. A conventional printer for product printing includes a print inspection apparatus that reads a printout from the printer by using an image capturing apparatus such as a camera and a scanner, and inspects whether printing is performed correctly based on the read printout.

Moreover, the printer may need to be maintained or repaired depending on an irregular image detected by the print inspection apparatus.

Accordingly, the print inspection apparatus may inspect print quality. In such a case, the print inspection apparatus often compares inspection data (a captured image) acquired by reading an image with reference data (a master image) that is provided, on the assumption that original image data prepared by a user is ripped, printed, and read. As a result of the comparison, the print inspection apparatus determines whether a difference between the master image and the read image is a defect based on a certain threshold.

When an original image is read by an apparatus such as a scanner or a copier, flares may appear in the captured image. A flare is a pseudo-signal generated due to scattering and reflection of incident light that is used to read the original image. Since the master image is not influenced by flare, a difference due to flaring is generated if the master image and the read image are compared directly.

SUMMARY

In at least one embodiment of this disclosure, there is provided an improved inspection apparatus that inspects printed matter generated based on print data by using a read image of a printed surface of the printed matter. The inspection apparatus includes processing circuitry that performs acquisition, calculation, correction, and comparison. The processing circuitry acquires the read image as an inspection target image, and acquires a reference image based on the print data. The processing circuitry calculates a flare inverse correction value based on flare that occurs at time of creation of the inspection target image. The processing circuitry performs flare inverse correction on the reference image based on the flare inverse correction value to acquire a corrected reference image. The processing circuitry compares the corrected reference image with the inspection target image to perform inspection.

Further provided is an improved image reading apparatus that includes an image reader that reads a printed surface of printed matter generated based on print data to generate a read image, and the inspection apparatus described above.

Still further provided is an improved image forming apparatus that includes an image forming device, an image reader, and the inspection apparatus described above. The image forming device generates printed matter based on print data. The image reader reads a printed surface of the printed matter to generate a read image.

Further provided is an improved inspection method for inspecting printed matter generated based on print data by using a read image of a printed surface of the printed matter. The inspection method includes acquiring the read image as an inspection target image, acquiring a reference image based on the print data, calculating a flare inverse correction value based on flare that occurs at time of creation of the inspection target image, performing a flare inverse correction on the reference image based on the flare inverse correction value to acquire a corrected reference image, and comparing the corrected reference image with the inspection target image to perform inspection.

Yet further provided is a non-transitory computer-readable recording medium storing inspection program code that causes a computer to execute the inspection method described above.

BRIEF DESCRIPTION OF THE DRAWINGS

The aforementioned and other aspects, features, and advantages of the present disclosure would be better understood by reference to the following detailed description considered in connection with the accompanying drawings, wherein:

FIG. 3 is a diagram illustrating an inspection method performed by a conventional inspection apparatus;

FIGS. 12A through 12E are diagrams illustrating an example of a series of inspection performed by the inspection apparatus;

Figure 1:
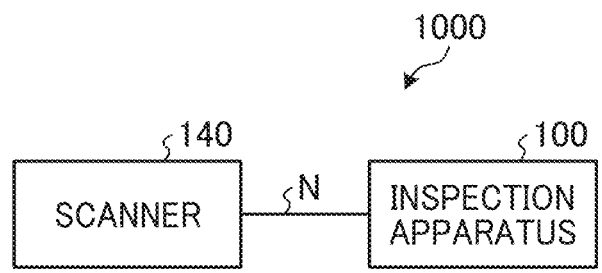
FIG. 1 is a diagram illustrating a configuration example of an inspection system according to one embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner and achieve similar results.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, an inspection apparatus, an image reading apparatus, an image forming apparatus, an inspection method, and a recording medium are described in detail with reference to the drawings.

First Embodiment

<System Configuration>

FIG. 1 is a diagram illustrating a configuration example of an inspection system 1000 according to a first embodiment. In the inspection system 1000 illustrated in FIG. 1, a scanner 140 and an inspection apparatus 100 are connected via a predetermined data transmission path N (e.g., a network cable and a serial/parallel cable).

The scanner 140 as an image reading apparatus optically reads a printed surface of printed matter to acquire a read image. The inspection apparatus 100 as an information processing apparatus inspects print quality of the printed matter based on the read image of the printed surface.

Accordingly, a user can use a service (hereinafter referred to as an inspection service) that inspects print quality of printed matter. For example, a user inputs an image formed by ripping print data for acquisition of printed matter to the inspection apparatus 100. Herein, the image formed by ripping the print data is input as a reference image for inspection of print quality. Then, the user causes a printed surface of the printed matter to be read by the scanner 140.

As a result, the scanner 140 transmits the read image to the inspection apparatus 100. The inspection apparatus 100 compares the received read image with the input reference image to detect a difference in pixel value, and performs a defect determination process based on the detected difference in pixel value and an inspection threshold (a defect criterion) that has been set. Thus, the user can acquire a print quality inspection result.

Accordingly, the inspection system 1000 with such a system configuration can provide a printed matter inspection service. The inspection system 1000 may have a configuration in which a plurality of scanners 140 is connected to a single inspection apparatus 100. If a large volume of printed matter is to be inspected, for example, in commercial printing, such a configuration enables the plurality of scanners 140 to read a plurality of pieces of printed matter at the same time and the inspection apparatus 100 to perform the defect determination process in a parallel processing manner. Hence, print quality inspection can be efficiently executed.

<Hardware Configuration>

Next, a hardware configuration of the inspection apparatus 100 according to the present embodiment is described.

Figure 2:
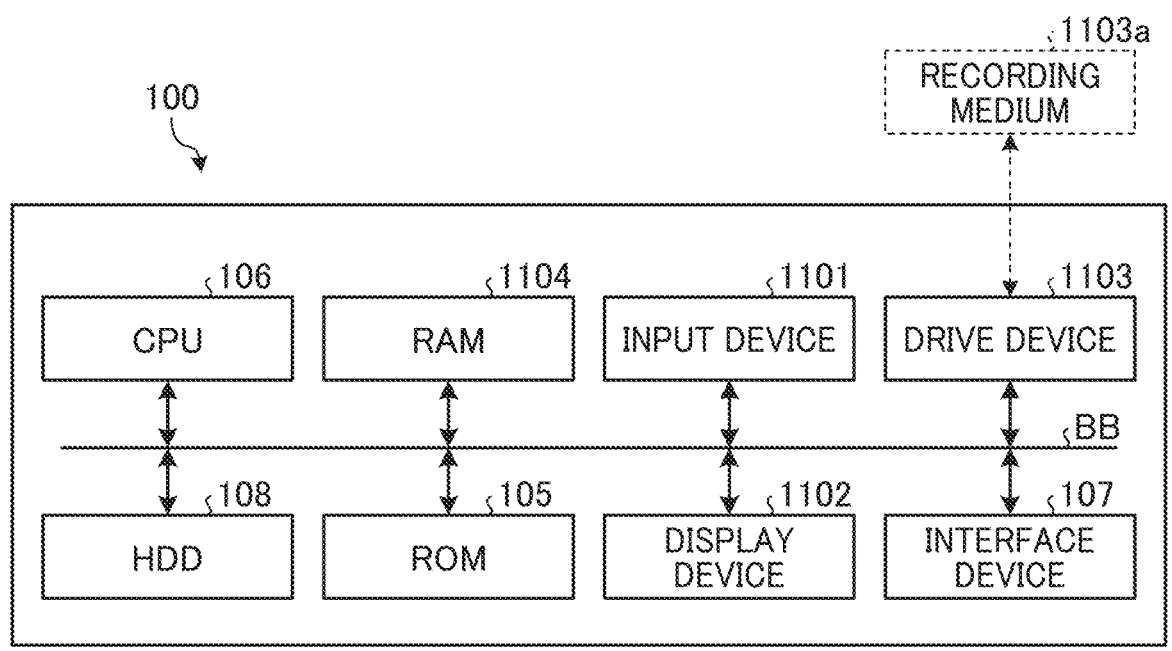
FIG. 2 is a diagram illustrating a hardware configuration example of an inspection apparatus.

FIG. 2 is a diagram illustrating a hardware configuration example of the inspection apparatus 100. As illustrated in FIG. 2, the inspection apparatus 100 includes an input device 1101, a display device 1102, a drive device 1103, a random access memory (RAM) 1104, a read only memory (ROM) 105, a central processing unit (CPU) 106, an interface device 107, and a hard disk drive (HDD) 108 that are connected to one another via a bus BB.

The input device 1101 includes a keyboard and a mouse. The input device 1101 is used to input each of operation signals to the inspection apparatus 100. The display device 1102 includes a display to display a result of a process performed by the inspection apparatus 100.

The interface device 107 as an interface connects the inspection apparatus 100 to the data transmission path N. The inspection apparatus 100 can perform data communication with other equipment having a communication function via the interface device 107. An example of the other equipment includes the scanner 140.

The HDD 108 is a non-volatile storage device in which a program and data are stored. A program and data to be stored include an information process system (e.g., an operating system (OS) of basic software such as Windows (registered trademark) and UNIX (registered trademark)) that comprehensively controls the inspection apparatus 100, and an application that provides various functions (e.g., an inspection function) on the system. Moreover, the HDD 108 manages the stored program and data by a predetermined file system and/or a database (DB).

The drive device 1103 is an interface to a detachable recording medium 1103a. The inspection apparatus 100 can read information from and/or write information in the recording medium 1103a via the drive device 1103. The recording medium 1103a is, for example, a compact disk (CD), a digital versatile disc (DVD), a secure digital (SD) memory card, or a universal serial bus (USB) memory.

The ROM 105 is a non-volatile semiconductor memory storage device) that can retain internal data even if the power is turned off. In the ROM 105, a program and data such as a basic input/output system (BIOS) that is executed at the time of activation of the inspection apparatus 100, an information processing system setting, and a network setting are stored. The RAM 1104 is a volatile semiconductor memory (a storage device) that temporarily retains a program and data. The CPU 106 is an operational device that reads out a program and data from the storage device (e.g., the HDD or the ROM) to the RAM to execute a process, thereby comprehensively controlling the apparatus and providing an installed function.

A program to be executed by the inspection apparatus 100 of the present embodiment is recorded and provided as a file in an installable format or executable format in a computer-readable recording medium such as a CD-ROM, a flexible disk (FD), a compact disc recordable (CD-R), and a DVD.

Alternatively, a program to be executed by the inspection apparatus 100 of the present embodiment may be stored in a computer connected to a network such as the Internet. In such a case, the program is downloaded via the network. Moreover, a program to be executed by the inspection apparatus 100 of the present embodiment may be provided or distributed via a network such as the Internet.

A program to be executed by the inspection apparatus 100 of the present embodiment may be incorporated beforehand into a memory such as a ROM.

According to the present embodiment, therefore, the inspection apparatus 100 with such a hardware configuration can provide the inspection service.

<Inspection Function>

Before an inspection function according to the present embodiment is described, a conventional inspection function is described.

FIG. 3 is a diagram illustrating an inspection method performed by a conventional inspection apparatus. As illustrated in FIG. 3, the conventional inspection apparatus acquires a read image "a" of a printed surface (the read image "a" is hereinafter referred to as an inspection target image), and an image "b" formed by ripping print data (the image "b" is hereinafter referred to as a reference image). The inspection apparatus analyzes a degree of flatness indicating a change in pixel value in the acquired reference image "b". The inspection apparatus identifies an image area for each type based on a flatness analysis result. Then, the inspection apparatus determines an inspection threshold (a defect criterion) with respect to the identified image area, and sets an image having the defect criteria to a threshold image "c". The inspection apparatus compares a pixel corresponding to the identified image area in the threshold image "c" with a pixel corresponding to a position that is substantially the same as the identified image area in the inspection target image "a" to detect a difference between the pixel values. The inspection apparatus determines whether the detected difference exceeds a threshold to inspect a defect area on the printed surface.

However, the conventional inspection function consumes time for calculation of a flare correction value at the time of creation of the inspection target image, and a next process cannot be performed until calculation of the flare correction value is completed. Moreover, even if a flare correction value is quickly calculated, the inspection cannot proceed to a next process until a reference image is input.

On the other hand, the inspection apparatus 100 according to the present embodiment creates an inversely corrected flare reference image formed by inversely correcting flare of a reference image (an image formed by ripping print data), and creates a threshold image.

Accordingly, the inspection apparatus 100 of the present embodiment increases processing speed at the time of print quality inspection including flare correction.

Hereinafter, a configuration and an operation of an inspection function are described. The inspection function is provided when the CPU 106 of the inspection apparatus 100 operates according to a program.

Figure 4:
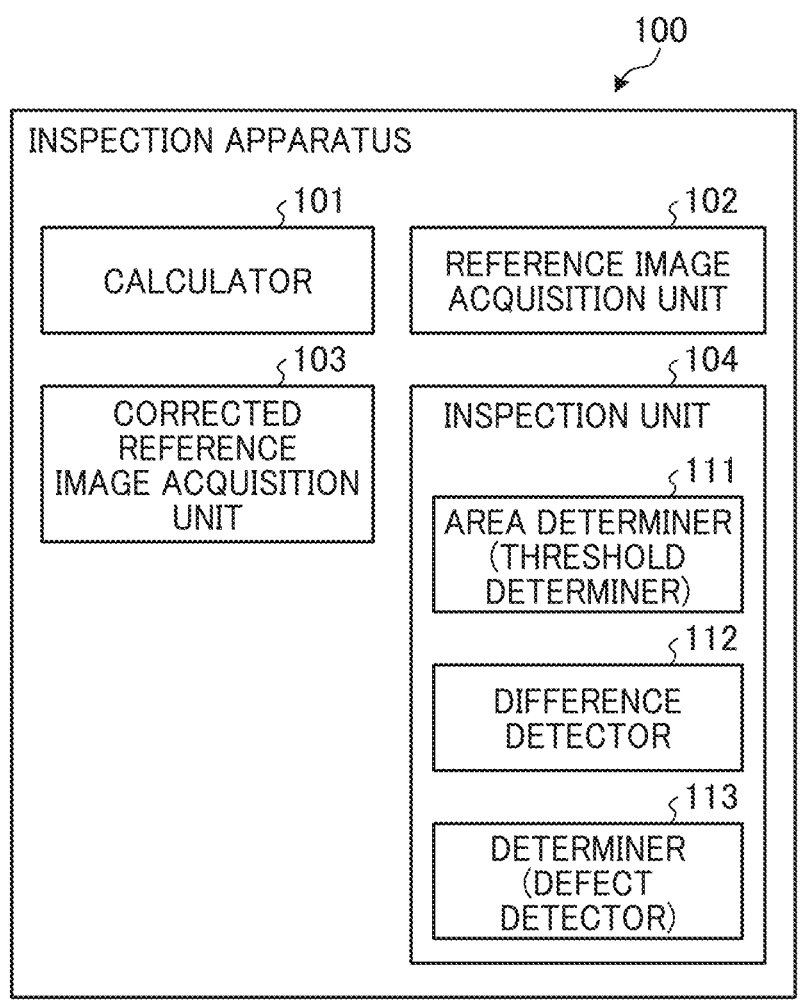
FIG. 4 is a block diagram illustrating a functional configuration of the inspection apparatus.
Figure 5:
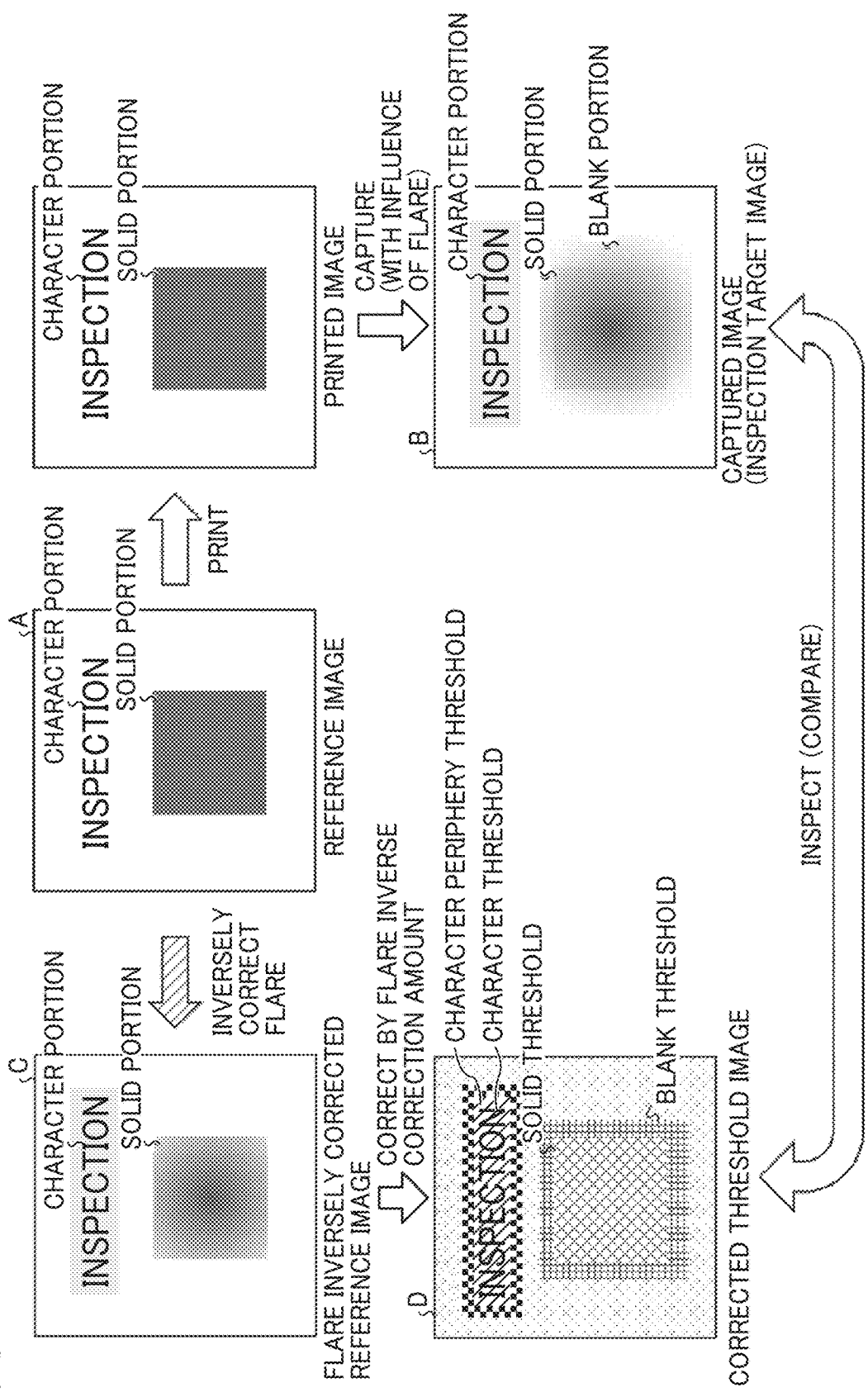
FIG. 5 is a diagram illustrating an inspection method performed by the inspection apparatus.

FIG. 4 is a block diagram illustrating a functional configuration of the inspection apparatus 100. FIG. 5 is a diagram illustrating an inspection method performed by the inspection apparatus 100.

As illustrated in FIG. 4, the inspection apparatus 100 includes a calculator 101, a reference image acquisition unit 102, a corrected reference image acquisition unit 103, and an inspection unit 104.

The reference image acquisition unit 102 receives an input of an image formed by ripping print data to acquire a reference image A. Moreover, the reference image acquisition unit 102 receives a read image of a printed surface from the scanner 140 to acquire an inspection target image B.

The calculator 101 calculates a flare inverse correction value based on flare that occurs when the inspection target image B is created from the reference image A. That is, the calculator 101 calculates a difference between the reference image A and the inspection target image B having flare as a flare inverse correction value.

The corrected reference image acquisition unit 103 performs flare inverse correction on the reference image A based on the flare inverse correction value to acquire a corrected reference image C. That is, the corrected reference image acquisition unit 103 adds the flare inverse correction value to the reference image A to acquire the corrected reference image C.

The inspection unit 104 compares a corrected threshold image D that is created from the corrected reference image C with the inspection target image B to perform inspection.

The inspection unit 104 includes an area determiner (a threshold determiner) 111, a difference detector 112, and a determiner (a defect detector) 113. The inspection unit 104 can change a threshold for each area such as a character portion, a pattern portion, and solid portion. The inspection unit 104 can change a threshold depending on whether an area is an edge or a non-edge.

The area determiner (the threshold determiner) 111 as a functional unit identifies an image area for each type in the corrected reference image C based on an analysis result (a calculated value indicating a degree of flatness) acquired by a known flatness analysis method. The area determiner 111 determines "a background area", "an edge area", and "a pattern area" in a printing area based on the calculated values each indicating a degree of flatness.

Moreover, the area determiner 111 determines an inspection threshold (a defect criterion) for the identified image area. As mentioned above, a defect determination process is desirably performed using different thresholds for a smooth area having a high degree of flatness (an area having a small change in pixel value) and a non-smooth area having a low degree of flatness (an area having a large change in pixel value) to improve the accuracy of the printing area inspection. Thus, the area determiner 111 allocates a plurality of thresholds (e.g., setting values such as "45", "30", "15", and "4") that have been set in stages beforehand to the respective types of the identified image areas, thereby determining an inspection threshold (a defect criterion) to be used at the time of defect determination process. In particular, an inspection threshold (a defect criterion) is determined by the following method.

For example, an identified area may be "a background area" in the printing area. In such a case, in the printing area, the background area has the smallest change in pixel value (the smallest difference in pixel value) between a given pixel and an adjacent pixel, and such a small change in pixel value needs to be detected. Thus, the smallest value (e.g., a setting value of "4") is identified as an inspection threshold out of values including values for a non-printing area (a blank area) and other areas (a pattern area and an edge area) in the printing area.

On the other hand, an identified area may be "an edge area" in the printing area. In such a case, in the printing area, the edge area has the largest change in pixel value (the largest difference in pixel value) between a given pixel and an adjacent pixel, and a small change in pixel value does not need to be detected. Thus, the largest value (e.g., a setting value of "45") is identified as an inspection threshold out of values including values for other areas (the background area and a pattern area) in the printing area.

An identified area may be "a pattern area" in the printing area. In such a case, in the printing area, the pattern area has a larger change in pixel value (a difference in pixel value) between a given pixel and an adjacent pixel than "the background area" and a smaller change in the pixel value than "the edge area". Thus, an intermediate value (e.g., a setting value of "15") is identified as an inspection threshold out of values including values for other areas (the background area and the edge area) in the printing area.

Moreover, "a blank area" of the non-printing area has the highest degree of flatness out of areas to be determined. However, in "the blank area" of the non-printing area, a stain on a sheet corresponds to a defect area. In view of such a characteristic of the stain, the blank area has a large change in pixel value (a difference in pixel value) between a given pixel (a pixel corresponding to the stain on the sheet) and an adjacent pixel, and a small change in pixel value can be detected. Accordingly, if an identified area is "a blank area" of the non-printing area, a value (e.g., a setting value of "30") that is intermediate between the setting values allocated to "the pattern area" and "the edge area" in the printing area is identified as an inspection threshold.

Therefore, the inspection unit 104 changes an inspection threshold (a defect criterion) on an image area type basis (for each of "a blank area", "a background area", "a pattern area", and "an edge area") according to a degree of flatness indicating a pixel value change acquired by analysis of the corrected reference image C. That is, the inspection unit 104 changes detection sensitivity to a defect area according to a degree of flatness of the corrected reference image C.

The difference detector 112 as a functional unit detects a difference between pixel values based on comparison between the corrected reference image C and the inspection target image B received from the reference image acquisition unit 102. The difference detector 112 compares a pixel corresponding to the identified image area in the corrected reference image C with a pixel corresponding to a position that is substantially the same as the identified image area in the inspection target image B, thereby detecting a difference between the pixel values.

The determiner (the detect detector) 113 as a functional unit executes a detect determination process. The determiner 113 determines whether the difference detected by the difference detector 112 exceeds the threshold (the inspection threshold for the image area on a type basis) determined by the area determiner 111. With a result of such determination, the determiner 113 determines whether a printed surface has a defect area (the determiner 113 inspects a defect area on a printed surface). In particular, the determiner 113 determines whether a defect area is present on a printed surface by the following method: For example, if the detected difference exceeds the threshold, the determiner 113 determines that an image area in the inspection target image B has an error (a defect).

Accordingly, the inspection unit 104 performs defect determination for each identified image area to inspect a defect area on a printed surface.

Therefore, the inspection function according to the present embodiment is provided by cooperation of the aforementioned functional units. The inspection function according to the present embodiment is provided if an operational device (e.g., a CPU) reads out a program (software for the inspection function) stored (installed) in the inspection apparatus 100 from a storage device (e.g an HDD or a ROM) to a memory (a RAM), and executes the following process based on the program.

The inspection function of the present embodiment (cooperation of the functional unit group) is described in detail with reference to a flowchart.

Figure 6:
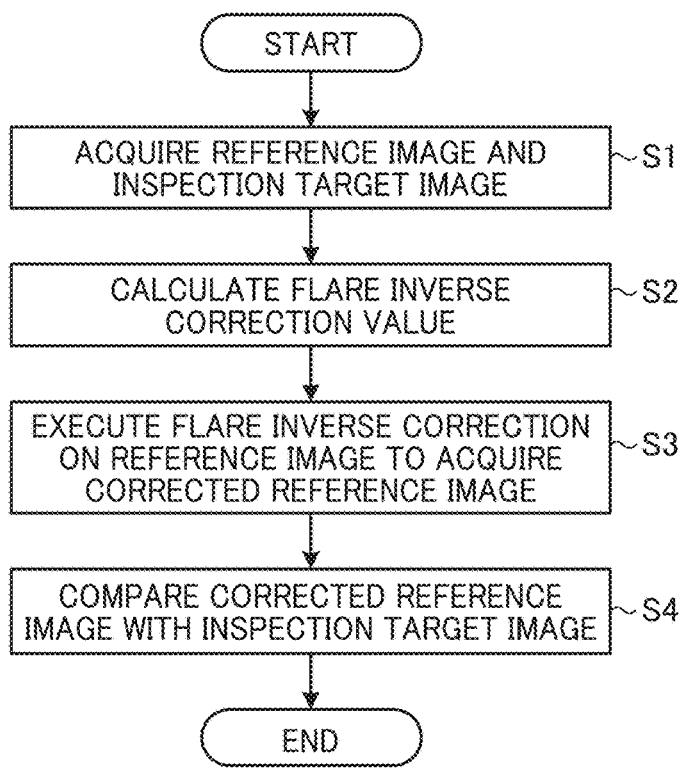
FIG. 6 is a flowchart illustrating a defect inspection process.

FIG. 6 is a flowchart illustrating a defect inspection process according to the present embodiment. In step S1, the inspection apparatus 100 (the reference image acquisition unit 102) acquires a reference image A and an inspection target image B.

In step S2, the inspection apparatus 100 (the calculator 101) calculates a flare inverse correction value from the reference image A.

Subsequently, in step S3, the inspection apparatus 100 (the corrected reference image acquisition unit 103) performs flare inverse correction on the reference image A based on the flare inverse correction value to acquire a corrected reference image C. That is, the corrected reference image C is substantially the same as the captured image (the inspection target image) B with influence of flare.

In step S4, the inspection apparatus 100 (the inspection unit 104) compares the corrected reference image C with the inspection target image B to perform inspection.

With such an inspection apparatus 100 according to the present embodiment, the corrected reference image C and the inspection target image B can be compared without sluggish flare correction of the inspection target image B, so that processing speed at the time of print quality inspection can be increased. Moreover, since the effects of flare can be excluded, inspection can be performed with good accuracy.

Second Embodiment

A second embodiment is described below.

The second embodiment differs from the first embodiment in the inspection method employed. Hereinafter, components and configurations that differ from components and configurations of the first embodiment will be described, and description of like components will be omitted.

Figure 7:
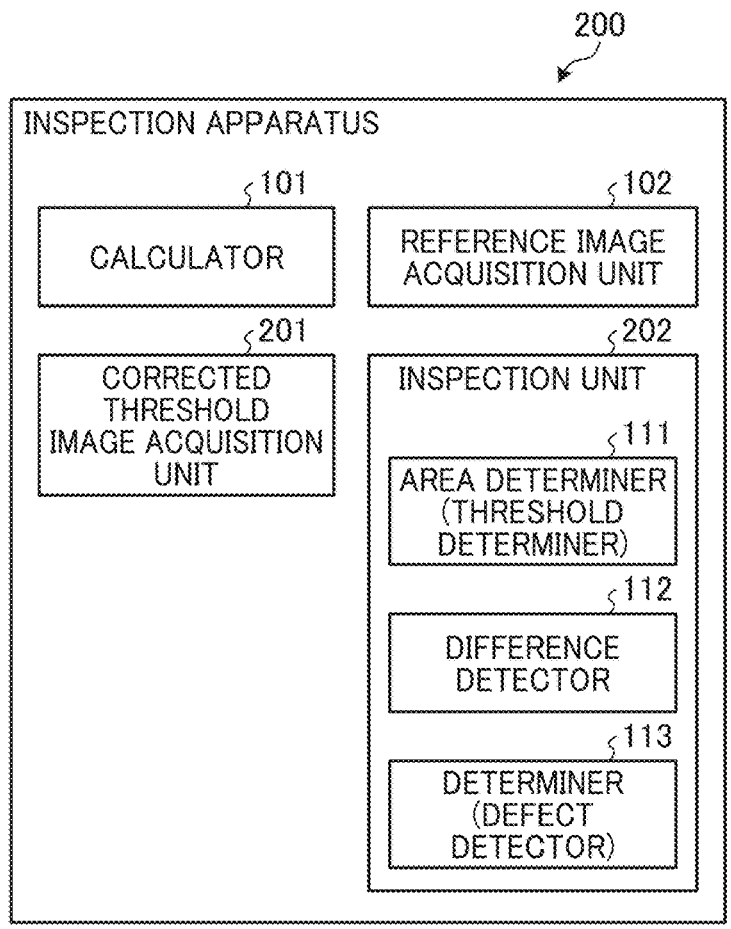
FIG. 7 is a block diagram illustrating a functional configuration of an inspection apparatus according to another embodiment of the present disclosure.
Figure 8:
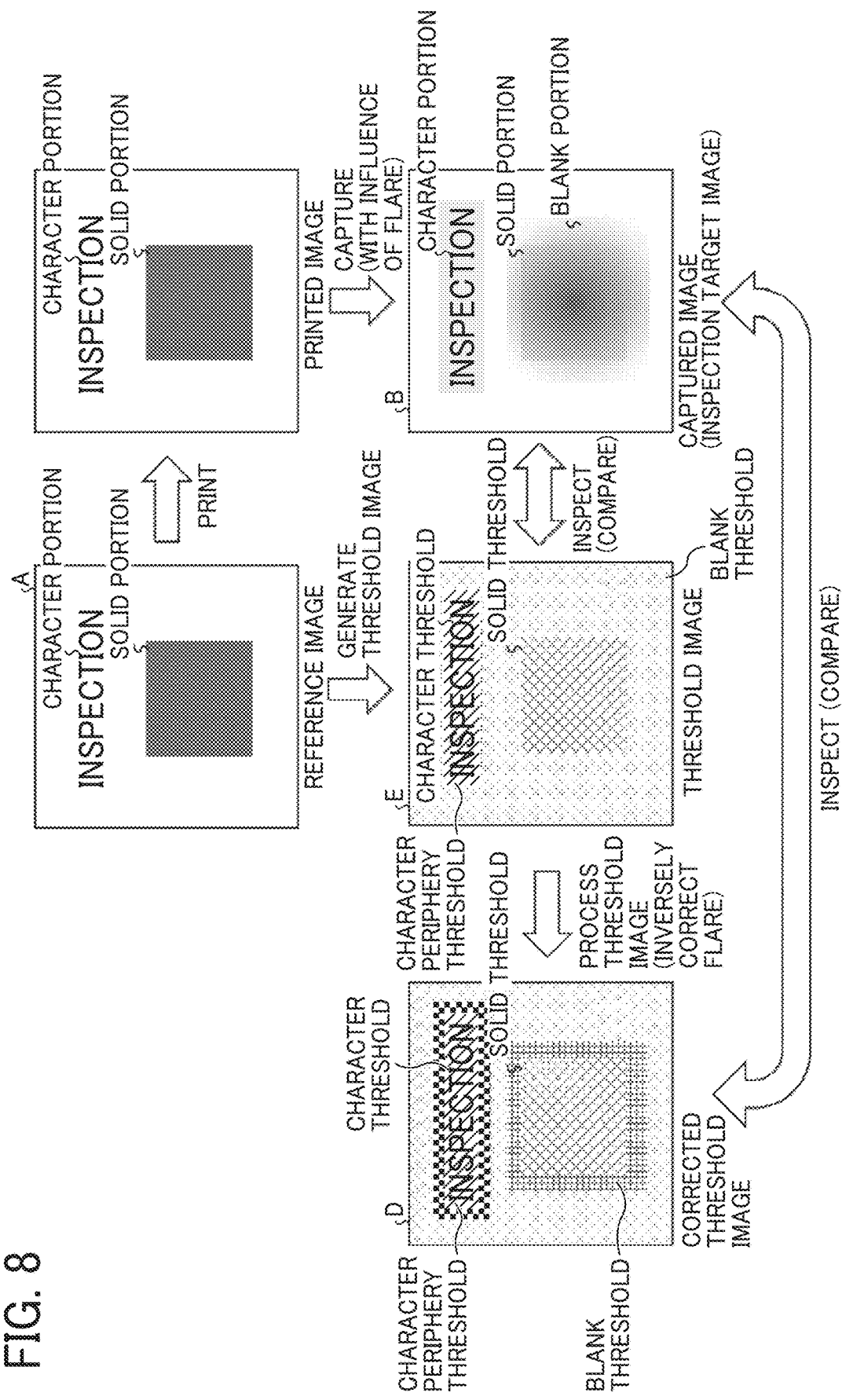
FIG. 8 is a diagram illustrating an inspection method performed by the inspection apparatus.

FIG. 7 is a block diagram illustrating a functional configuration of an inspection apparatus 200 according to the second embodiment. FIG. 8 is a diagram illustrating an inspection method performed by the inspection apparatus 200.

As illustrated in FIG. 7, the inspection apparatus 200 includes a calculator 101, a reference image acquisition unit 102, a corrected threshold image acquisition unit 201, and an inspection unit 202.

The reference image acquisition unit 102 receives an input of an image formed by ripping print data to acquire a reference image A. Moreover, the reference image acquisition unit 102 receives a read image of a printed surface from a scanner 140 to acquire an inspection target image B.

The calculator 101 calculates a flare inverse correction value based on flare that occurs when the inspection target image B is created from the reference image A. That is, the calculator 101 calculates a difference between the reference image A and the inspection target image B having flare as a flare inverse correction value.

The corrected threshold image acquisition unit 201 creates a threshold image E that has thresholds calculated for respective areas from the reference image A. Then, the corrected threshold image acquisition unit 201 performs flare inverse correction on the threshold image E based on the flare inverse correction value to acquire a corrected threshold image D. That is, the corrected threshold image acquisition unit 201 adds the flare inverse correction value to the threshold image E to acquire the corrected threshold image D.

The inspection unit 202 compares the corrected threshold image D, which has been corrected using the flare inverse correction value, with the inspection target image B to perform inspection.

An inspection function of the present embodiment (cooperation of a functional unit group) is described in detail with reference to a flowchart.

Figure 9:
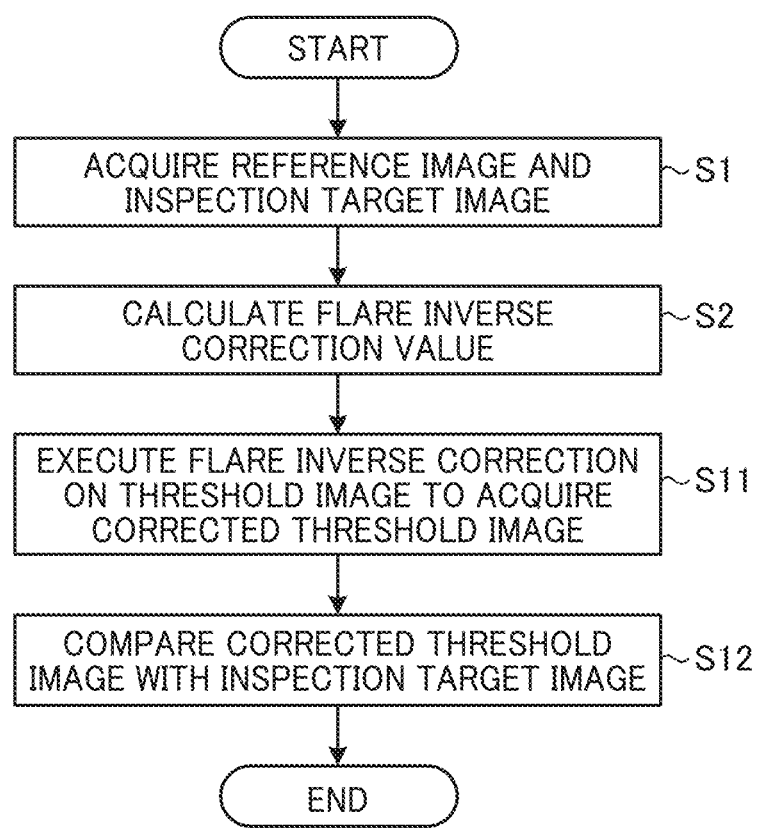
FIG. 9 is a flowchart illustrating a defect inspection process.

FIG. 9 is a flowchart illustrating a defect inspection process according to the present embodiment. In step S1, the inspection apparatus 200 (the reference image acquisition unit 102) acquires a reference image A and an inspection target image B.

In step S2, the inspection apparatus 200 (the calculator 101) calculates a flare inverse correction value from the reference image A.

Subsequently, in step S11, the inspection apparatus 200 (the corrected threshold image acquisition unit 201) creates a threshold image E from the reference image A, and performs flare inverse correction on the threshold image E based on the flare inverse correction value to acquire a corrected threshold image D.

In step S12, the inspection apparatus 200 (the inspection unit 202) compares the corrected threshold image D with the inspection target image B to perform inspection.

With such an inspection apparatus 200 according to the present embodiment, the corrected threshold image D and the inspection target image B can be compared without sluggish flare correction of the inspection target image B, so that processing speed at the time of print quality inspection can be increased. Moreover, since the effects of flare can be excluded, inspection can be performed with good accuracy.

According to the inspection apparatus 200 of the present embodiment, moreover, a flare inverse correction value may be calculated from a reference image A while a threshold image E is being created from the reference image A.

Figure 10:
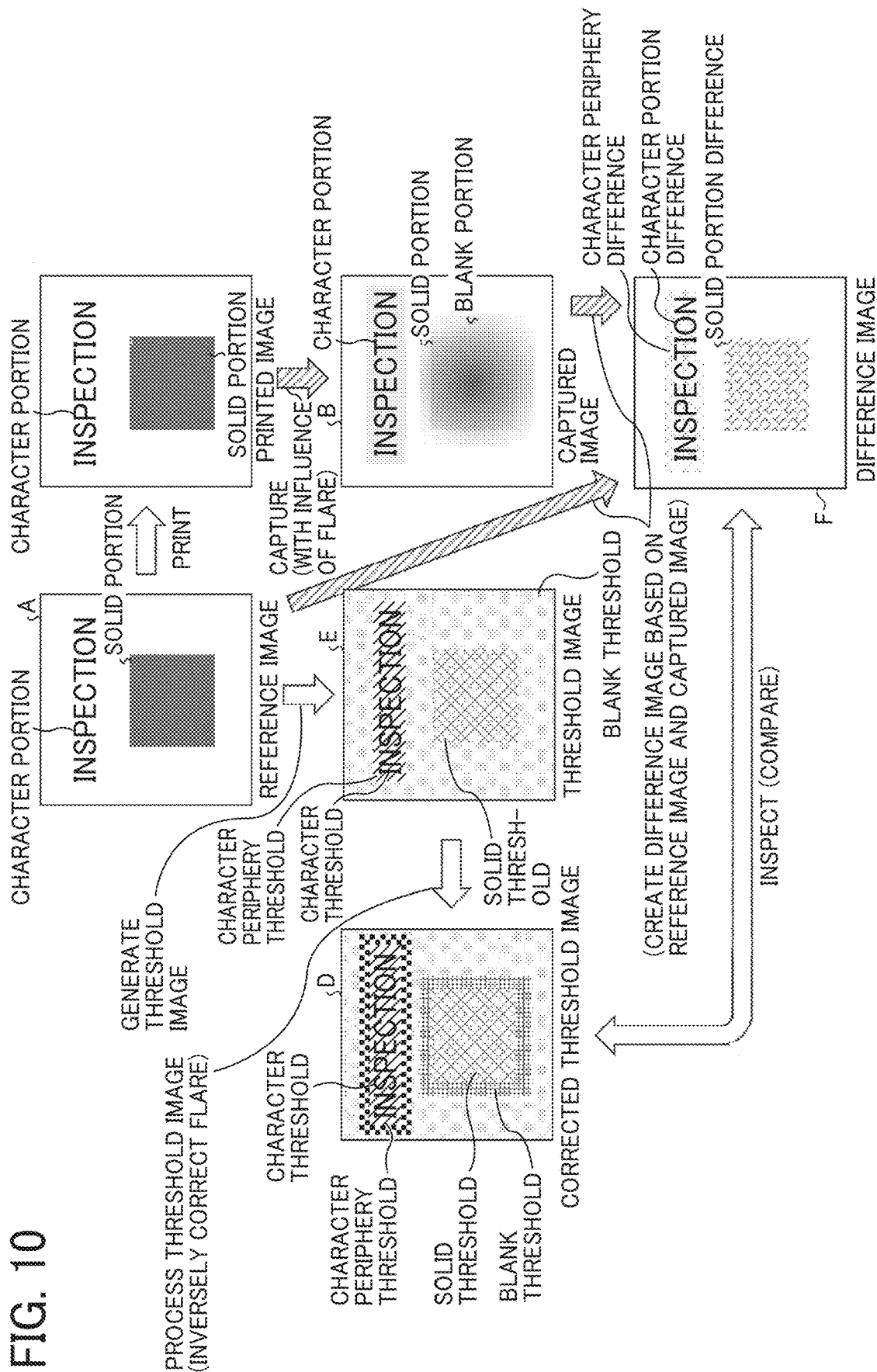
FIG. 10 is a diagram illustrating a modification of the inspection method performed by the inspection apparatus.

FIG. 10 is a diagram illustrating a modification of the inspection method performed by the inspection apparatus 200. As illustrated in FIG. 10, the inspection apparatus 200 (the reference image acquisition unit 102) can create a difference image F representing a difference between a reference image A and an inspection target image B. In such a case, the inspection apparatus 200 (the inspection unit 202) compares a corrected threshold image with the difference image F to perform inspection.

Third Embodiment

A third embodiment is described.

The third embodiment differs from the second embodiment in that a flare inverse correction is made on a specific area of a reference image. Hereinafter, components and configurations that differ from components and configurations of the first embodiment or the second embodiment will be described, and description of like components will be omitted.

Figure 11:
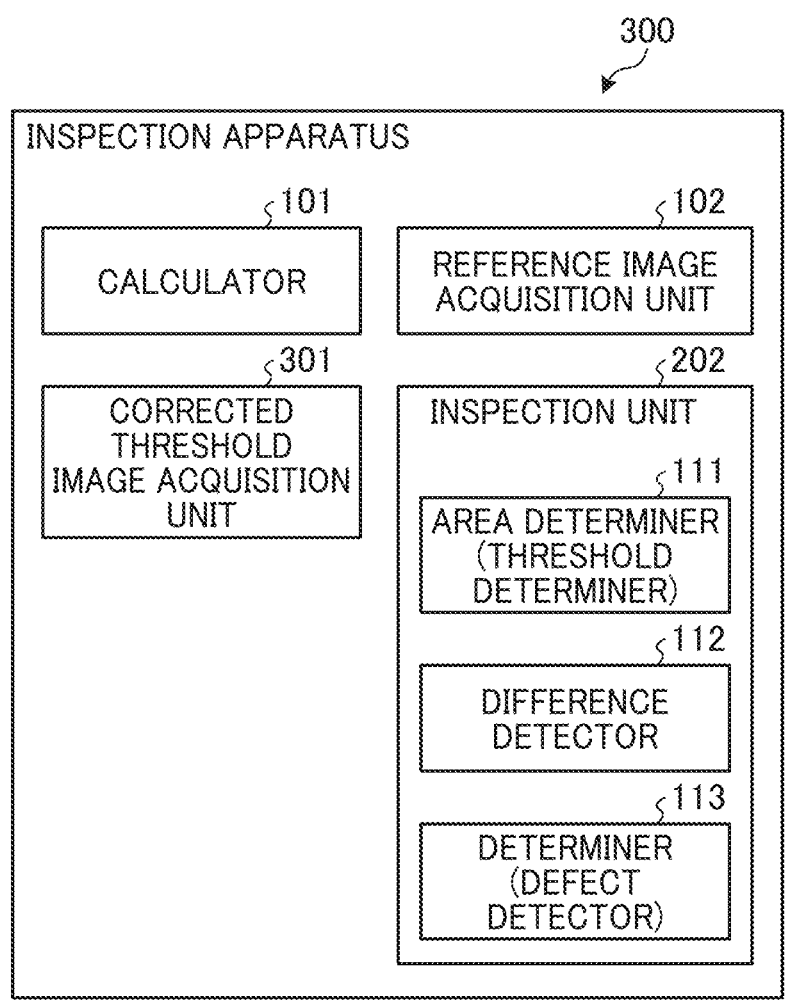
FIG. 11 is a block diagram illustrating a functional configuration of an inspection apparatus according to still another embodiment of the present disclosure.

FIG. 11 is a block diagram illustrating a functional configuration of an inspection apparatus 300 according to the third embodiment. The inspection apparatus 300 illustrated in FIG. 11 inspects print quality of printed matter based on a read image of a printed surface.

As illustrated in FIG. 11, the inspection apparatus 300 includes a calculator 101, a reference image acquisition unit 102, a corrected threshold image acquisition unit 301, and an inspection unit 202.

The calculator 101 calculates a flare inverse correction value based on flare that occurs when an inspection target image B is created from a reference image A. That is, the calculator 101 calculates a difference between a reference image A and an inspection target image B having flare as a flare inverse correction value.

The reference image acquisition unit 102 receives an input of an image formed by ripping print data to acquire a reference image A. Moreover, the reference image acquisition unit 102 receives a read image of a printed surface from a scanner 140 to acquire an inspection target image B.

The corrected threshold image acquisition unit 301 creates a threshold image E that has thresholds calculated for respective areas from the reference image A. Then, the corrected threshold image acquisition unit 301 performs flare inverse correction on the threshold image E based on a flare inverse correction value to acquire a corrected threshold image D. Moreover, the corrected threshold image acquisition unit 301 performs flare inverse correction on only a specific area (a flat portion) of the reference image A (the threshold image E) to create a corrected threshold image D. The term "flat portion" used herein represents an area (an area having a high degree of flatness) in which a change in pixel value is small. An example of the flat portion is a background.

The inspection unit 202 compares the corrected threshold image D corrected using the flare inverse correction value with the inspection target image B to perform inspection.

FIGS. 12A through 12E are diagrams illustrating an example of a series of inspection performed by the inspection apparatus 300. In the example illustrated in FIGS. 12A through 12E, a flare inverse correction is made on only a specific area (a flat portion (an area such as a background in which a change in pixel value is small (an area having a high degree of flatness))) of a reference image A (a threshold image E) such that a corrected threshold image D is created. In general, inspection in which color of a flat portion is measured needs to be performed with high accuracy, and thus a flare inverse correction is made on only an area, such as a flat portion of a reference image, on which inspection is strictly performed.

According to the present embodiment, a flare inverse correction can be made on only an area, such as a flat portion (an area such as a background in which a change in pixel value is small (an area having a high degree of flatness)) of a reference image A, on which inspection is strictly performed. Thus, strict inspection in which color tint is checked can be performed on several points in a solid portion (a flat portion), whereas easy inspection can be performed on other areas.

<Modification>

A modification of the above embodiments is described. (Modification 1)

Each of the above embodiments is described using the respective inspection apparatuses 100, 200, and 300 as hardware environment in which an inspection function operates, but is not limited thereto. For example, each of the above embodiments can be applied to an image reading apparatus 400 as illustrated in FIG. 13.

Figure 13:
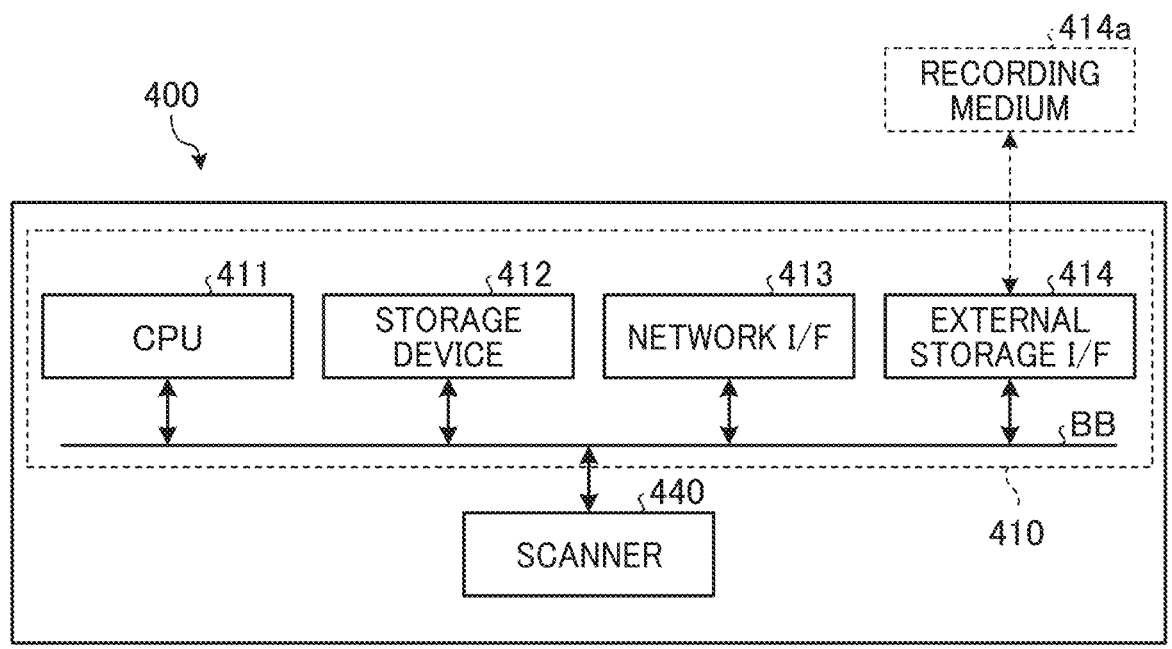
FIG. 13 is a diagram illustrating a hardware configuration example of an image reading apparatus in which an inspection function operates.

FIG. 13 is a diagram illustrating a hardware configuration example of the image reading apparatus 400 in which an inspection function operates. As illustrated in FIG. 13, the image reading apparatus 400 includes a controller 410 and a scanner 440 that are connected to each other via a bus BB.

The scanner 440 as an image reader optically reads printed matter to generate a read image. The controller 410 as a control board includes a CPU 411, a storage device 412, a network interface (I/F) 413, and an external storage OF 414 that are connected to one another via the bus BB.

The storage device 412 including a RAM, a ROM, and/or an HDD stores and retains various programs and data. The CPU 411 as an operational device reads out a program or data from the ROM or HDD to the RAM (a memory), and executes a process (executes a process based on the read program or data), thereby comprehensively controlling the apparatus and providing an installed function. Therefore, the execution of the program read out to the RAM by the CPU 411 can provide the above-described inspection function.

The network I/F 413 connects the image reading apparatus 400 to a data transmission path N, so that the image reading apparatus 400 can perform data communication with other equipment having a communication function via the network I/F 413. The external storage I/F 414 is an interface to a recording medium 414a as an external storage device. The recording medium 414a is, for example, a secure digital (SD) memory card and a universal serial bus (USB) memory. Accordingly, the image reading apparatus 400 can read information from and/or write information in the recording medium 414a via the external storage I/F 414.

Therefore, the image reading apparatus 400 can independently provide a printed matter inspection service by such a hardware configuration.

(Modification 2)

Figure 14:
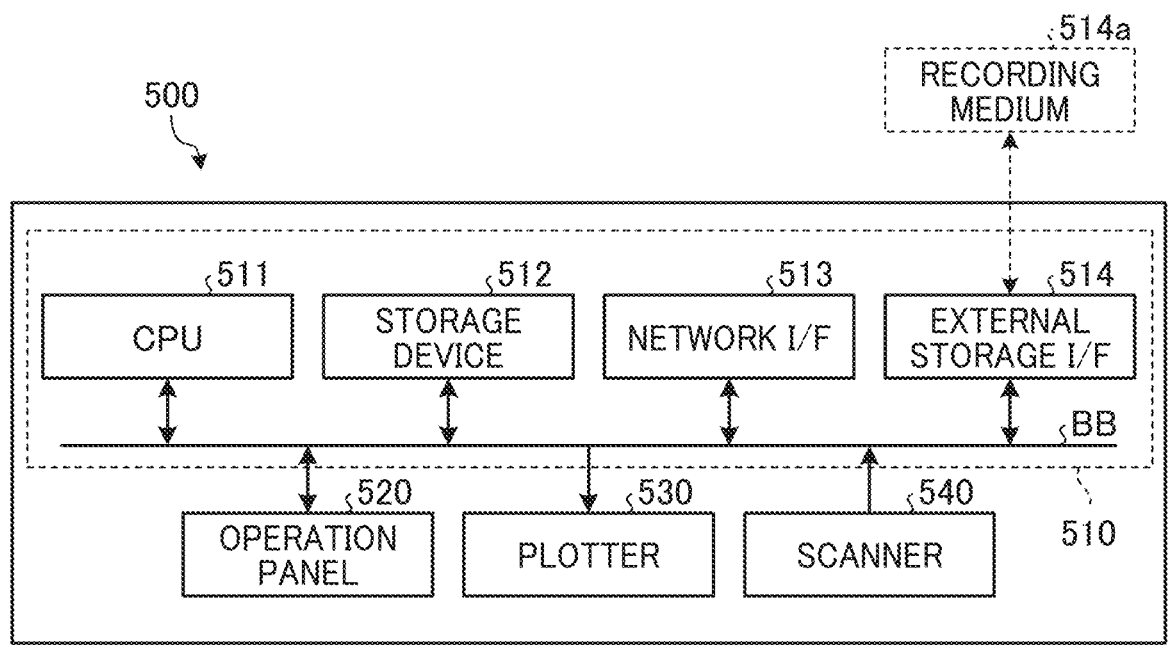
FIG. 14 is a diagram illustrating a hardware configuration example of an image forming apparatus in which an inspection function operates.

Each of the above-described embodiments can also be applied to an image forming apparatus such as a multifunctional peripheral (MFP) as illustrated in FIG. 14.

FIG. 14 is a diagram illustrating a hardware configuration example of an image forming apparatus 500 in which an inspection function operates. As illustrated in FIG. 14, the image forming apparatus 500 includes a controller 510, an operation panel 520, a plotter 530, and a scanner 540 as an image reader that are connected to one another via a bus BB.

The operation panel 520 as an input/display apparatus includes an input device and a display device. The operation panel 520 provides various pieces of information such as device information to a user, and receives various operations including an operation setting and an operation instruction from a user. The plotter 530 as an image forming device includes an image forming element to form an output image on a sheet based on print data. A method for forming an output image is, for example, an electrophotographic process and an inkjet method.

The controller 510 as a control board includes a CPU 511, a storage device 512, a network I/F 513, and an external storage I/F 514 that are connected to one another via the bus BB.

The storage device 512 including a RAM, a ROM, and an HDD stores and retains various programs and data. The CPU 511 as an operational device reads out a program or data from the ROM or HDD to the RAM and executes a process (executes a process based on the read program or data from the storage device 512), thereby comprehensively controlling the apparatus and providing an installed function. Therefore, the execution of the program read out to the RAM by the CPU 511 can provide the above-described inspection function.

The network I/F 513 connects the image forming apparatus 500 to a data transmission path N, so that the image forming apparatus 500 can perform data communication with other equipment having a communication function via the network I/F 513. The external storage I/F 514 is an interface to a recording medium 514a as an external storage device. The recording medium 514a is, for example, an SD memory card and a USB memory. Accordingly, the image forming apparatus 500 can read information from and/or write information in the recording medium 514a via the external storage I/F 514.

Similar to the image reading apparatus 400, the image forming apparatus 500 can independently provide a printed matter inspection service by the aforementioned hardware configuration.

Moreover, the above embodiment has been described using an example of the inspection system 1000 in which the scanner 140 and the inspection apparatus 100 are connected, but is not limited thereto. For example, the inspection apparatus 100 may be connected to the image reading apparatus 400 or the image forming apparatus 500. In such a case, an inspection target image B is transmitted from the image reading apparatus 400 or the image forming apparatus 500 to the inspection apparatus 100.

The present disclosure has been described above with reference to specific embodiments but is not limited thereto. Various modifications and enhancements are possible without departing from scope of the disclosure. It is therefore to be understood that the present disclosure may be practiced otherwise than as specifically described herein. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An inspection apparatus that inspects printed matter generated based on print data by using a read image of a printed surface of the printed matter, the inspection apparatus comprising processing circuitry configured to:
    acquire the read image as an inspection target image;
    acquire a reference image based on the print data;
    create a threshold image having different thresholds calculated for different areas, from the reference image;
    calculate a flare inverse correction value based on flare that occurs at time of creation of the inspection target image;
    perform flare inverse correction on the threshold image based on the flare inverse correction value to acquire a corrected threshold image;
    create a difference image representing a difference between the reference image and the inspection target image; and
    compare the corrected threshold image, corrected using the flare inverse correction value with the difference image to perform inspection.

2. The inspection apparatus according to claim 1, wherein the processing circuitry is further configured to perform flare inverse correction on only an area having a high degree of flatness in the reference image to acquire the corrected threshold image.

3. An image reading apparatus comprising:
    an image reader configured to read a printed surface of printed matter generated based on print data to generate a read image; and
    the inspection apparatus according to claim 1.

4. An image forming apparatus comprising:
an image forming device configured to generate printed matter based on print data;
an image reader configured to read a printed surface of the printed matter to generate a read image; and
the inspection apparatus according to claim 1.

5. An inspection method for inspecting printed matter generated based on print data by using a read image of a printed surface of the printed matter, the inspection method comprising:
acquiring the read image as an inspection target image;
acquiring a reference image based on the print data;
creating a threshold image having different thresholds calculated for different areas, from the reference image;
calculating a flare inverse correction value based on flare that occurs at time of creation of the inspection target image;
performing flare inverse correction on the threshold image based on the flare inverse correction value to acquire a corrected threshold image; and
creating a difference image representing a difference between the reference image and the inspection target image; and
comparing the corrected threshold image, corrected using the flare inverse correction value with the difference image to perform inspection.

6. The inspection method according to claim 5, further comprising creating a threshold image having different thresholds calculated for different areas from the reference image to perform flare inverse correction on the threshold image based on the flare inverse correction value to acquire a corrected threshold image,
wherein the comparing compares the corrected threshold image corrected using the flare inverse correction value with the inspection target image to perform inspection.

7. A non-transitory computer-readable recording medium storing inspection program code that causes a computer to execute an inspection method for inspecting printed matter generated based on print data by using a read image of a printed surface of the printed matter, the inspection method comprising:
acquiring the read image as an inspection target image;
acquiring a reference image based on the print data;
creating a threshold image having different thresholds calculated for different areas, from the reference image,
calculating a flare inverse correction value based on flare that occurs at time of creation of the inspection target image;
performing flare inverse correction on the threshold image based on the flare inverse correction value to acquire a corrected threshold image; and
creating a difference image representing a difference between the reference image and the inspection target image; and
comparing the corrected threshold image, corrected using the flare inverse correction value with the difference image to perform inspection.

8. The non-transitory computer-readable recording medium according to claim 7, wherein the inspection method further comprises creating a threshold image having different thresholds calculated for different areas from the reference image to perform flare inverse correction on the threshold image based on the flare inverse correction value to acquire a corrected threshold image,
wherein the comparing compares the corrected threshold image corrected using the flare inverse correction value with the inspection target image to perform inspection.

* * * * *